United States Patent [19]

Garman

[11] Patent Number: 5,119,494

[45] Date of Patent: Jun. 2, 1992

[54] APPLICATION ADDRESS DISPLAY WINDOW MAPPER FOR A SHARABLE MS-DOS PROCESSOR

[75] Inventor: Jonathan D. Garman, Los Altos, Calif.

[73] Assignee: Athenix Corporation, Sunnyvale, Calif.

[21] Appl. No.: 551,592

[22] Filed: Jul. 10, 1990

[51] Int. Cl.⁵ .................................... G06F 12/10
[52] U.S. Cl. ........................... 395/700; 364/DIG. 1; 364/237.3; 364/239.7; 364/245.6; 364/255.7; 364/246.3
[58] Field of Search ... 364/200 MS File, 900 MS File, 364/518; 340/798, 799

[56] References Cited

U.S. PATENT DOCUMENTS

| | | | |
|---|---|---|---|
| 4,103,331 | 7/1978 | Thacker | 364/200 |
| 4,121,283 | 10/1978 | Walker | 364/200 |
| 4,799,146 | 1/1989 | Chauvel | 364/200 |
| 4,811,284 | 3/1989 | Adler et al. | 364/900 |
| 4,862,154 | 8/1984 | Gonzalez-Lopez | 340/799 X |
| 4,903,218 | 2/1990 | Longo et al. | 364/900 X |

Primary Examiner—Thomas M. Heckler
Attorney, Agent, or Firm—Skjerven, Morrill, MacPherson, Franklin & Friel

[57] ABSTRACT

In accordance with the present invention, an address mapper is provided between the CPU running a MS-DOS application program and a frame buffer, so as to allow the frame buffer to be mapped into the CPU address space expected by a MS-DOS application program. A write operation by the MS-DOS application program into the CPU's display address space is translated by the address mapper to be performed in the address space of the frame buffer, providing to the user the appearance as if the frame buffer is part of the CPU's address space ("Virtual MS-DOS display"). This frame buffer may have an address space larger than that used by the MS-DOS application program for writing to the display. This additional space can be allocated to other processes, which are each protected from inadvertently reading or writing into another process' allocated memory space.

6 Claims, 3 Drawing Sheets

APPLICATION ADDRESS DISPLAY WINDOW MAPPER FOR A SHARABLE MS-DOS PROCESSOR

FIELD OF THE INVENTION

This invention pertains to the execution of MS-DOS TM [1] programs on a remote host. In particular, this invention pertains to the execution of a MS-DOS program which provides output on a graphical display.

1 MS-DOS is a trademark of Microsoft, Inc. Washington.

BACKGROUND OF THE INVENTION

In a computer system which directly associates frame buffers to locations in the main memory ("memory mapped frame buffers"), an application program simply writes bits corresponding to graphical images into a memory mapped frame buffer using the assigned memory address of the frame buffer. In order to display the images, the hardware of a display station need only read from the frame buffer for the graphical images written, without the intervention of the computer system. This is a very efficient approach for executing application programs, since it imposes no operating system overhead cost between the application program and the display, allowing the application program to control the display directly, and to effectuate display in a predictable and timely manner. This approach has allowed such features as animated sequences to be displayed.

However, if such application program is run on a system in which the frame buffer is not directly mapped into memory, the prior art method for allowing the application program to run on this system is to have the processor (CPU) executing the application program recognize ("trap") every attempt to write into the address space assigned to the frame buffer, and handle the attempt to write into the address space as an exception condition. When such an attempt to write is trapped, the processor will execute code designed to provide the same effects ("emulate") as if the application program is executed on a memory mapped frame buffer system. Emulation incurs great overhead time cost, since dozens or even hundreds of instructions may be necessary to emulate one write instruction that the native machine, i.e. one which memory maps frame buffers, would use to write one pixel. As a result, such emulation inevitably causes the application to run extremely slowly.

In particular, for application programs designed for the MS-DOS operating system ("MS-DOS application programs"), which expect a memory mapped frame buffer system, such as implemented in the IBM PC TM [2] personal computers, the overhead cost of handling the display requirement under emulation can cause them to run very slowly. A number of commercial products have been developed to allow MS-DOS application programs to run on other CPUs without a memory mapped frame buffer system. A popular method is the centralized multiuser system, running a MS-DOS application on behalf of a remotely connected client terminal over a communication line, which is at a speed below that necessary to support video transmission. In such centralized multiuser system, the operating system traps a frame buffer write operation of the application program and emulates the display by translating the frame buffer write operation into a control sequence which can be transmitted at low speed to the remote terminal. Nevertheless, even if the connection is over a high speed network, the network overhead time cost still results in a relatively low speed transfer from the CPU to the remote display.

2 IBM PC is a Trademark of International Business Machines, Inc., New York.

SUMMARY OF THE INVENTION

In accordance with the present invention, an address mapper is provided between the CPU running a MS-DOS application program and a frame buffer, so as to allow the frame buffer to be mapped into the CPU's address space expected by a MS-DOS application program. A write operation by the MS-DOS application program into the CPU's display address space is translated by the address mapper such that the write operation is performed in the address space of the frame buffer, providing to the user the appearance as if the frame buffer is part of the CPU's address space ("Virtual MS-DOS display"). This frame buffer may have an address space larger than that used by the MS-DOS application program for writing to the display. This additional space can be allocated to other processes, which are each protected from inadvertently reading or writing into another process' allocated memory space.

These and other features of the present invention are better understood in conjunction with the following description and the accompanying drawings.

DETAILED DESCRIPTION OF THE PREFERRED EMBODIMENTS

The embodiments of the present invention will be described in the following, using as example a MS-DOS processor implemented on a novel multiple X Window display station Controller, called the Z-controller. The Z-controller is described in the copending application entitled "Workgroup Controller Architecture for Multiple Display Stations to be used with X Windows," by Robert A. Garrow, U.S. patent application Ser. No. 551,694, filed on the same day as this application, assigned Athenix Corporation, and is hereby incorporated by reference in its entirety.

The following embodiments of the present invention are provided in a controller for multiple display stations designed for use with the X Windows system. Typically, each display station has a display larger than that associated with the IBM PC family of personal computers, on which MS-DOS application programs are normally expected to run. In these embodiments, a portion of the display is used as a window within which a virtual MS-DOS display may operate.

Figure 1:
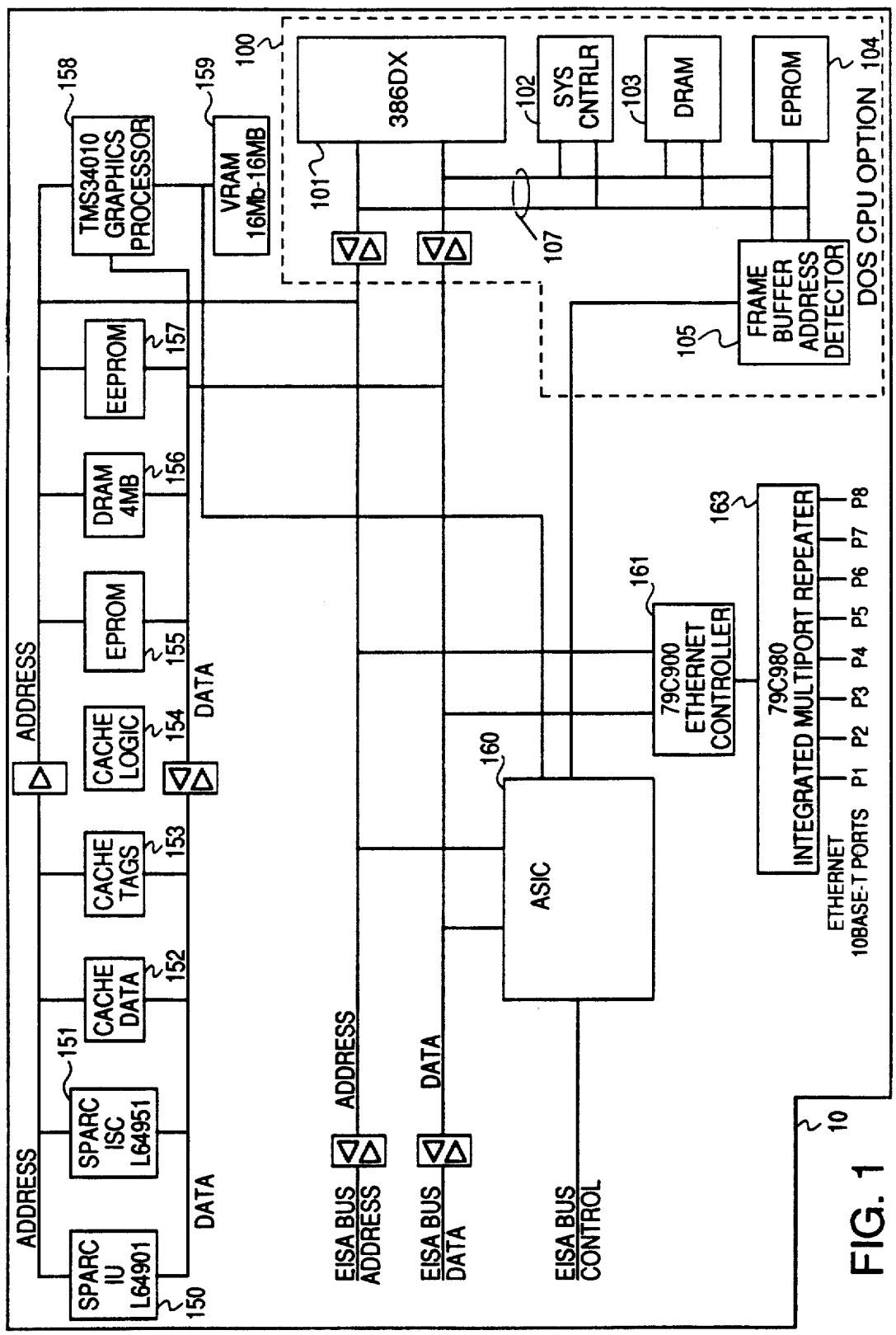
FIG. 1 shows a multiple X Window display station controller 10 comprising a MS-DOS processor 100, in which is implemented a window mapper 160 and a frame buffer address detector 105, in accordance with the present invention.

One embodiment of the present invention is shown in FIG. 1. FIG. 1 shows a Z-controller 10 with a MS-DOS processor 100 in accordance with the present invention.

Figure 3:
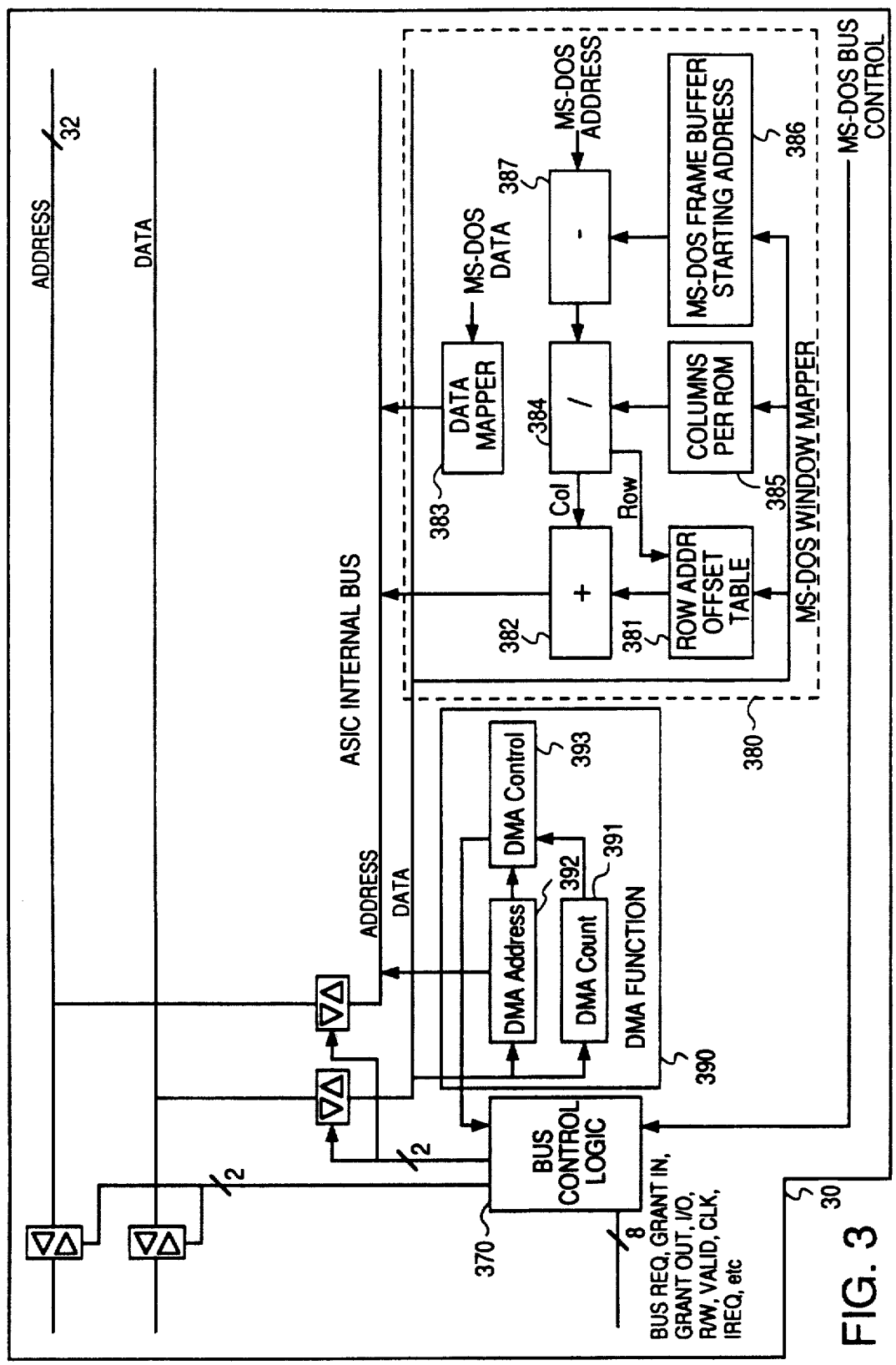
FIG. 3 is a block diagram of custom circuit 160, which provides the window mapping function, bus control and DMA control logic functions.

In addition to the MS-DOS processor 100, the Z-controller has a main processor 150, a integrated system controller 151, a cache memory including units 152-154, main memory including units 155-157, a graphics processor 158, and video random access memory (VRAM) 159. The Z-controller is integrated with a host computer (not shown) and communicates with the host computer over, in this example, a local Extended Industry Standard Architecture (EISA) host bus. Although an EISA bus is used in this example, other host native buses may also be used. The Z-controller's communication on the host native bus is controlled by a custom circuit 160, which also includes the circuit for implementing the MS-DOS window mapper in accordance with the present invention. FIG. 3 shows a block diagram of the custom circuit 160, which provides the window mapping function, the bus control and direct memory access (DMA) control logic functions.

As shown in FIG. 3, the bus control logic 370 implements the host bus control function for the Z-controller. DMA control logic 390 provides the control for DMA operations. The DMA control logic unit 390 comprises a DMA address register 392, a DMA control module 393 which provides the DMA protocol signals, and DMA count register 391 which keeps count of the amount of data to be transferred.

Also shown in FIG. 3 is MS-DOS window mapper unit 380, which provides the mapping function between the MS-DOS processor's address space and the MS-DOS window's address space in the frame buffer. MS-DOS window mapper unit 380 comprises, integer division unit 384, adder unit 382, row address offset table registers 381, column-per-row register 385, MS-DOS frame buffer starting address register 386, MS-DOS address subtractor unit 387, and data mapper 383.

Integrated multiport repeater 163 (FIG. 1) provides connection to the display stations P1-P8 over a local area network controlled by Ethernet controller 161.

The MS-DOS processor 100 comprises a microprocessor 101, which is selected from the x86 microprocessor family available from Intel Corporation. For example, the microprocessor 101 is shown in FIG. 1 as a 386DX microprocessor, although there are other members of the x86 microprocessor family which may also be used. Microprocessor 101 is supported by system controller 102 and main memory, including dynamic random access memory (DRAM) 103, and electrically programmable read-only memory (EPROM) 104. EPROM 104 contains the bootstrap program for microprocessor 101. In this embodiment, a frame buffer address detector 105 is provided to trap any write operations by the MS-DOS processor to the MS-DOS display address space.

To invoke the virtual MS-DOS display feature, the user at an X Window display station runs the utility MS-DOS Display Window Manager (DWM), from an X window system utility, such as xterm. The disk manager software on the Z-controller 10 locates the program from the mass storage medium and transfer control to the X-server, which allocates in VRAM 159 an area in the frame buffer of the X Window display station as a MS-DOS Window. A MS-DOS window map is provided to the MS-DOS Window mapper (in the custom circuit 160), so that the MS-DOS Window mapper can provide an address translation ("map") from the MS-DOS address space to the MS-DOS Window in the display station's frame buffer. When an application program is invoked in the MS-DOS Window, the X-server then invokes the MS-DOS processor 100, which loads the application program into memory 103. In this embodiment, MS-DOS is modified to trap disk, communications, and keyboard accesses but allow display accesses to occur in standard MS-DOS fashion.

To implement the virtual MS-DOS frame buffer, the MS-DOS window within the selected frame buffer is mapped into MS-DOS address space expected by the application program. Note that it is the window which is mapped, not the physical frame buffer address, such that the origin of the window maps into the MS-DOS origin address. As the window is moved about the display, the mapper adjusts the mapping simultaneously with the window movement. The application program running on the MS-DOS processor is unaware (and indeed is not notified) that the window is moving, since the window moves with respect to the frame buffer and not with respect to the MS-DOS processor's address space.

The MS-DOS address space has pixel addresses contiguous and adjacent throughout the frame buffer in the MS-DOS processor's address space ("MS-DOS frame buffer"). There are two ways to implement this address space for display purpose: one pixel per address, or multiple pixels per address. In the case where each address is one pixel, the MS-DOS pixel address (DADDR) is first reduced to an address in a 2-dimensional Cartesian coordinate system (X,Y) with origin at the MS-DOS frame buffer starting address (DFBSA), by the following equations:

X = (DADDR − DFBSA) mod DCPR
Y = (DADDR − DFBSA)/DCPR where DCPR is the number of pixels per row in the MS-DOS frame buffer. The "mod" operation in the X equation is the integer remainder operation. The division in the Y equation is an integer division operation, where the fractional part of the quotient, if any, is discarded.

This (X, Y) coordinate pair is then translated into the MS-DOS window address (WADDR) using the following equation:

WADDR = WSA + Y*WCPR + X where WSA is the MS-DOS starting address at the frame buffer in VRAM 159 and WCPR is the number of pixels per row in the MS-DOS window. Although not necessary for the practice of the present invention, the row address offset table registers 381 provides a quick and convenient way to compute WADDR, by storing an array of pointers each pointing to the beginning of a row in the MS-DOS window. A valid pointer is provided when the row is visible in the MS-DOS window. With the row address offset table registers 381, WADDR = WRSA[Y] + x where WRSA[Y] the MS-DOS window row starting address for the Yth row. In general,

WRSA[Y+1] = WRSA[Y] + WCPR where WCPR is the number of pixels per row in the Display Frame Buffer.

When there are multiple pixels stored per MS-DOS address, a write operation on one pixel is a read-modify-write sequence, in order to preserve the values of the pixels at the same addressed word which are not modified. In this case, the update entity includes all pixels in the addressed word, i.e. all corresponding pixels of the addressed word in the MS-DOS window are updated. The X equation above is modified as follows:

$$X = ((DADDR - DFBSA)/DCPR) * DPPA$$

where the number of pixels per MS-DOS address word is DPPA. The X value thus computed is the address in the (X,Y) coordinate system of the lowest numbered pixel in the addressed word. $X+1, X+2, \ldots X+n$ are the respective X values of the remaining pixels in the MS-DOS address.

When the processor 101 within MS-DOS processor 100 attempts a write operation in an address allocated to the display, the operation is trapped by the frame buffer address detector 105. The frame buffer address detector 105 holds the processor 101 in a wait state to allow the translation of the MS-DOS address into the corresponding address in the frame buffer in VRAM 159. Processor 10 comes out of the wait state when the write operation is completed at the frame buffer.

A slight variation of this embodiment directs the writing through the mapper at two areas of the frame buffer in VRAM 159, one area corresponds to the visible portion of the MS-DOS Window, and the other area corresponds to the invisible portion of the MS-DOS Window. The invisible portion of the MS-DOS Window is a backing store, representing portions of the window which are occluded by other windows. In order to determine whether a given pixel is visible, each pixel is associated with a visibility bit which indicates whether the pixel is visible.

As the user moves the MS-DOS window on the display screen, the host window manager (X Window System) is receiving the move requests, notifies the DWM, which locks the MS-DOS processor 100 while the window is moving, and accordingly relocates both the window and the MS-DOS window map pointer. When the move is completed, the MS-DOS processor 100 is reenabled. This lock-move-unlock cycle may happen many times, pixel by pixel, as the window is moved around the screen.

Figure 2:
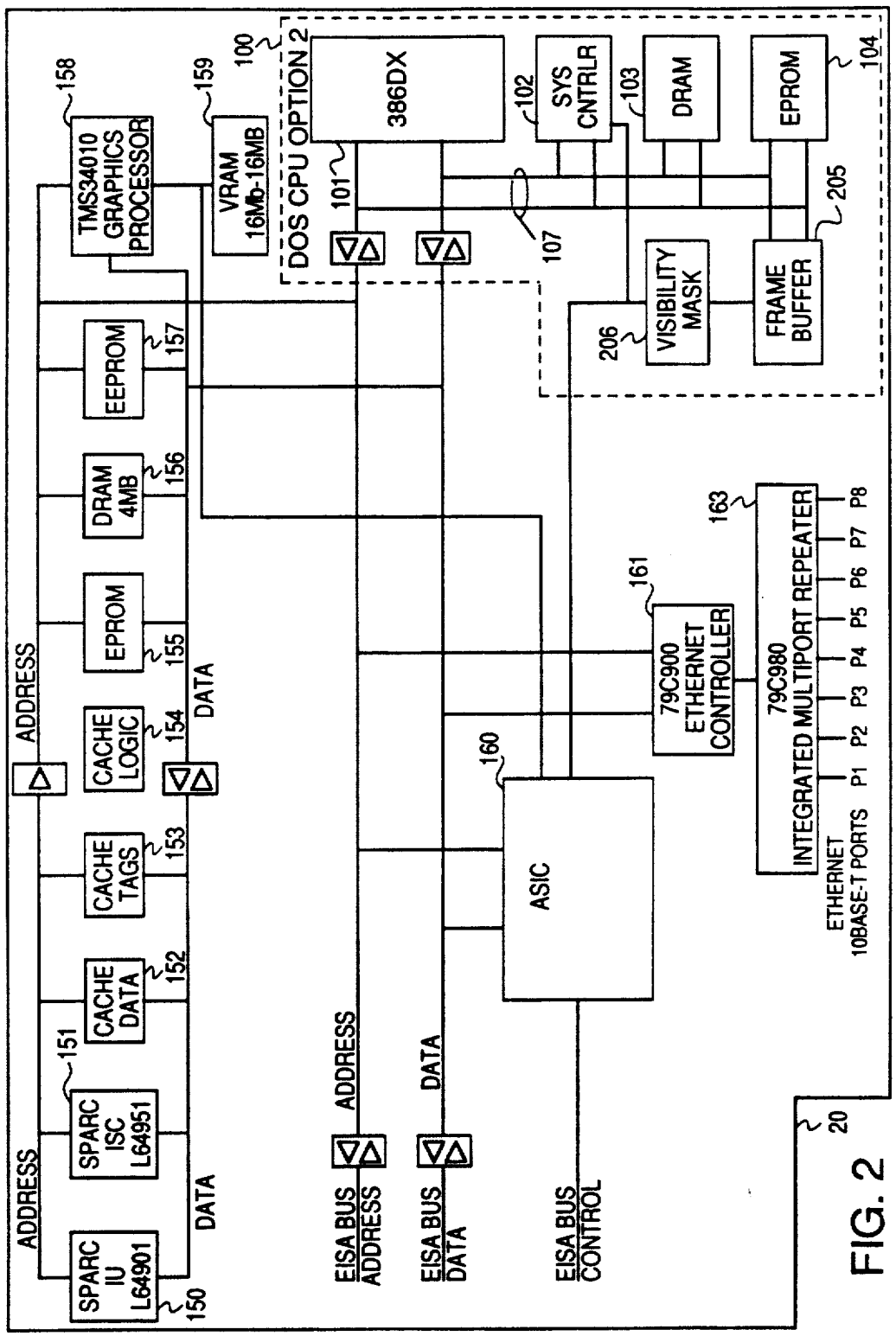
FIG. 2 shows a multiple X Window display station controller 20 comprising a MS-DOS processor 200, in which is implemented a window mapper 160 and a parallel frame buffer 205, in accordance with the present invention.

FIG. 2 shows another embodiment of the present invention. In FIG. 2, a Z-controller 20 is shown substantially identical to the Z-controller 10 shown in FIG. 1, except for the MS-DOS processor 200 in which, instead of the frame buffer address detector 106 shown in FIG. 1, a frame buffer 205 and a visibility mask 206 are provided on the MS-DOS CPU bus 107.

In this embodiment, the MS-DOS Window, the MS-DOS Window map and the application program are also invoked as described for Z-controller 10 above. The operation of MS-DOS processor 200 in this embodiment differs from the MS-DOS processor 100 in FIG. 1 when a write operation is attempted at an address of the CPU's display address space.

Since the frame buffer 205 is located on the MS-DOS CPU bus 107, a MS-DOS application program writing into this frame buffer 205 will experience no delay. The visibility mask 206 maintains a visibility map which indicates whether a pixel is visible currently on the display. The visibility map is updated as the windows of the display are moved. The visibility mask 206 also contains an address monitor which monitors whether a pixel written into the frame buffer 205 is visible on the display, by reference to the visibility map. If the pixel is visible, i.e. not covered by another open window, not iconized, etc., the pixel value at frame buffer 205 is sent through the window mapper to the visible frame buffer in VRAM 159. The part of the frame buffer in the MS-DOS processor 200 which is invisible, amounts to a backing store for the visible frame buffer in VRAM 159. Because this method does not require holding the processor 101 in a wait state, this embodiment shown in FIG. 2 provides the virtual display feature at higher performance than the embodiment shown in FIG. 1.

The embodiments described herein are intended to illustrate the general principles of the present invention. A skilled person in the art will be able to provide numerous modifications and variations within the scope of the present invention upon consideration of the above detailed description and the accompanying drawings.

I claim:

1. A structure for allowing a MS-DOS program running on a MS-DOS processor to cause a write operation into a frame buffer address of a frame buffer at a remote display station using a MS-DOS address, as if said frame buffer is in said MS-DOS processor's display address space, said structure comprising:
   address mapping means for maintaining a translation table between addresses in said frame buffer and addresses in said MS-DOS processor's display address space, and for translating said MS-DOS address into said frame buffer address in accordance with said translation table;
   address detection means for detecting when said MS-DOS program write operation is initiated using said MS-DOS address, and for causing said address mapping means to translate said MS-DOS address into said frame buffer address; and,
   effectuating means for causing said write operation using said frame buffer address.

2. A structure as in claim 1, wherein each location of said frame buffer comprises a mask bit indicating whether said location corresponds to a pixel visible on said display station.

3. A structure for allowing a MS-DOS program running on a MS-DOS processor to cause a write operation into a frame buffer address of a remote frame buffer at a remote display station using a MS-DOS address, as if said frame buffer is in said MS-DOS processor's display address space, said structure comprising:
   address mapping means for maintaining a translation table between addresses in said remote frame buffer and addresses in said MS-DOS processor's display address space, and for translating said MS-DOS address into said frame buffer address in accordance with said translation table;
   local frame buffer means having addresses of said MS-DOS processor's display address space for said MS-DOS program to write into using said MS-DOS address;
   address monitor means for maintaining a visibility table indicating whether each location in said remote frame buffer is visible at said remote display station, for causing said address mapping means to translate said MS-DOS address into said frame buffer address, and for determining, in accordance with said visibility table whether the location in said remote frame buffer corresponding to said frame buffer address is visible at said remote display station; and
   effectuating means for causing said write operation when said address monitor means determines said frame buffer address to be visible at said remote display station.

4. A method for allowing a MS-DOS program running on a MS-DOS processor to cause a write operation into a frame buffer address of a remote frame buffer at a remote display station using a MS-DOS address, as if said frame buffer is in said MS-DOS processor's display address space, said method comprising the steps of:

provising address mapping means for maintaining a translation table between addresses in said frame buffer and addresses in said MS-DOS processor's display address space, and for translating said MS-DOS address into said frame buffer address in accordance with said translation table;

providing address detection means for detecting when said MS-DOS program write operation is initiated using said MS-DOS address, and for causing said address mapping means to translate said MS-DOS address into said frame buffer address; and, providing effectuating means for causing said write operation using said frame buffer address.

5. A method as in claim 4, further comprising the step of requiring each location of said frame buffer to comprise a mask bit indicating whether said location corresponds to a pixel visible on said display station.

6. A method for allowing a MS-DOS program running on a MS-DOS processor to cause a write operation into a frame buffer address of a remote frame buffer at a remote display station using a MS-DOS address, as if said frame buffer is in said MS-DOS processor's display address space, said method comprising:

providing address mapping means for maintaining a translation table between addresses in said remote frame buffer and addresses in said MS-DOS processor's display address space, and for translating said MS-DOS address into said frame buffer address in accordance with said translation table;

providing local frame buffer means having addresses of said MS-DOS processor's display address space for said MS-DOS program to write into using said MS-DOS address;

providing address monitor means for maintaining a visibility table indicating whether each location in said remote frame buffer is visible at said remote display station, for causing said address mapping means to translate said MS-DOS address into said frame buffer address, and for determining, in accordance with said visibility table whether the location in said remote frame buffer corresponding to said frame buffer address is visible at said remote display station; and providing effectuating means for causing said write operation when said address monitor means determines said frame buffer address to be visible at said remote display station.

* * * * *